United States Patent
Shinozaki et al.

[11] Patent Number: 6,062,352
[45] Date of Patent: May 16, 2000

[54] AIR DAMPER

[75] Inventors: Nobuya Shinozaki, Yokohama; Junji Muroi, Toyota; Masaaki Onitsuka, Toyota; Katsuya Nakagawa, Toyota, all of Japan

[73] Assignee: Piolax, Inc., Kanagawa-ken, Japan

[21] Appl. No.: 09/260,317

[22] Filed: Mar. 1, 1999

[30] Foreign Application Priority Data

Aug. 24, 1998 [JP] Japan .................................. 10-236826
Oct. 14, 1998 [JP] Japan .................................. 10-291636

[51] Int. Cl.⁷ .................................. F16F 9/36; F16F 5/00
[52] U.S. Cl. ...................... 188/322.16; 267/120; 188/300
[58] Field of Search .............................. 267/64.11, 64.28, 267/120, 124, 129; 188/300, 322.18

[56] References Cited

U.S. PATENT DOCUMENTS

| | | | |
|---|---|---|---|
| 3,963,227 | 6/1976 | Molders | 267/120 |
| 4,166,612 | 9/1979 | Freitag et al. | 267/120 |
| 4,303,231 | 12/1981 | Reuschenbach et al. | 267/120 |
| 4,307,874 | 12/1981 | Reuschenbach et al. | 267/120 |
| 4,856,625 | 8/1989 | Oshida . | |
| 5,040,645 | 8/1991 | Volpel et al. | 267/120 |
| 5,157,806 | 10/1992 | Wartian | 267/120 |
| 5,697,477 | 12/1997 | Hiramoto et al. . | |
| 5,975,507 | 11/1999 | Cotter | 267/64.28 |

FOREIGN PATENT DOCUMENTS 8105482 4/1996 Japan .

*Primary Examiner*—Chris Schwartz
*Attorney, Agent, or Firm*—Howard & Howard

[57] ABSTRACT

An air damper has a cylinder member provided at its opposite ends with openings. One opening is formed with a seal surface. A piston member is movable in the cylinder member along an axial direction of the cylinder member so as to generate a variation in pressure in the cylinder member. A cap member is provided on the one opening of the cylinder member. At least a portion of the cap member is capable of moving between a state where the cap member is in contact with the seal surface and a state where the cap member is separated from the seal member in correspondence with the variation in pressure caused by the movement of the piston member. Further, in a state where the cap member is separated from the seal surface, air in the cylinder member can flow out from a space between the cap member and the seal surface.

16 Claims, 14 Drawing Sheets

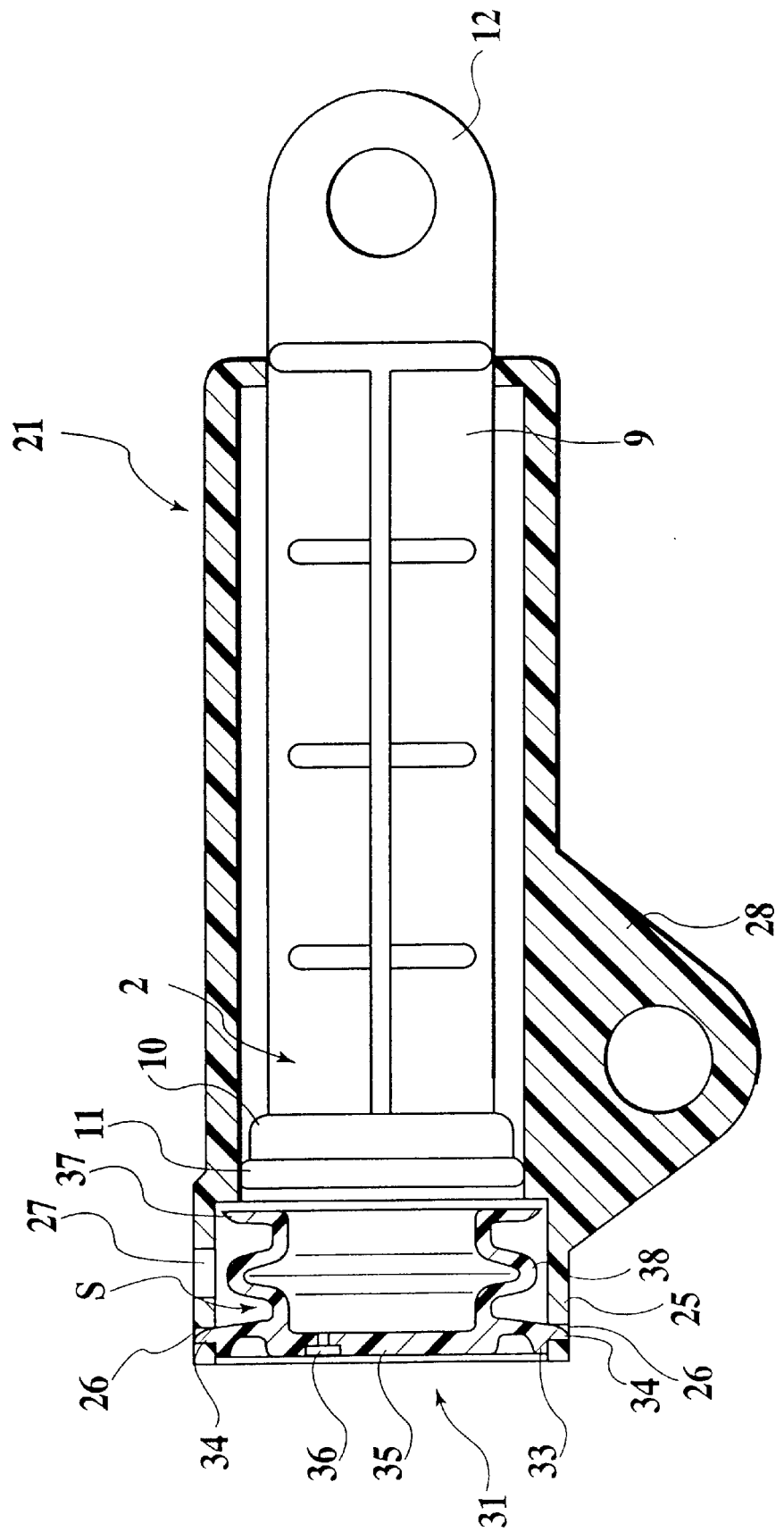

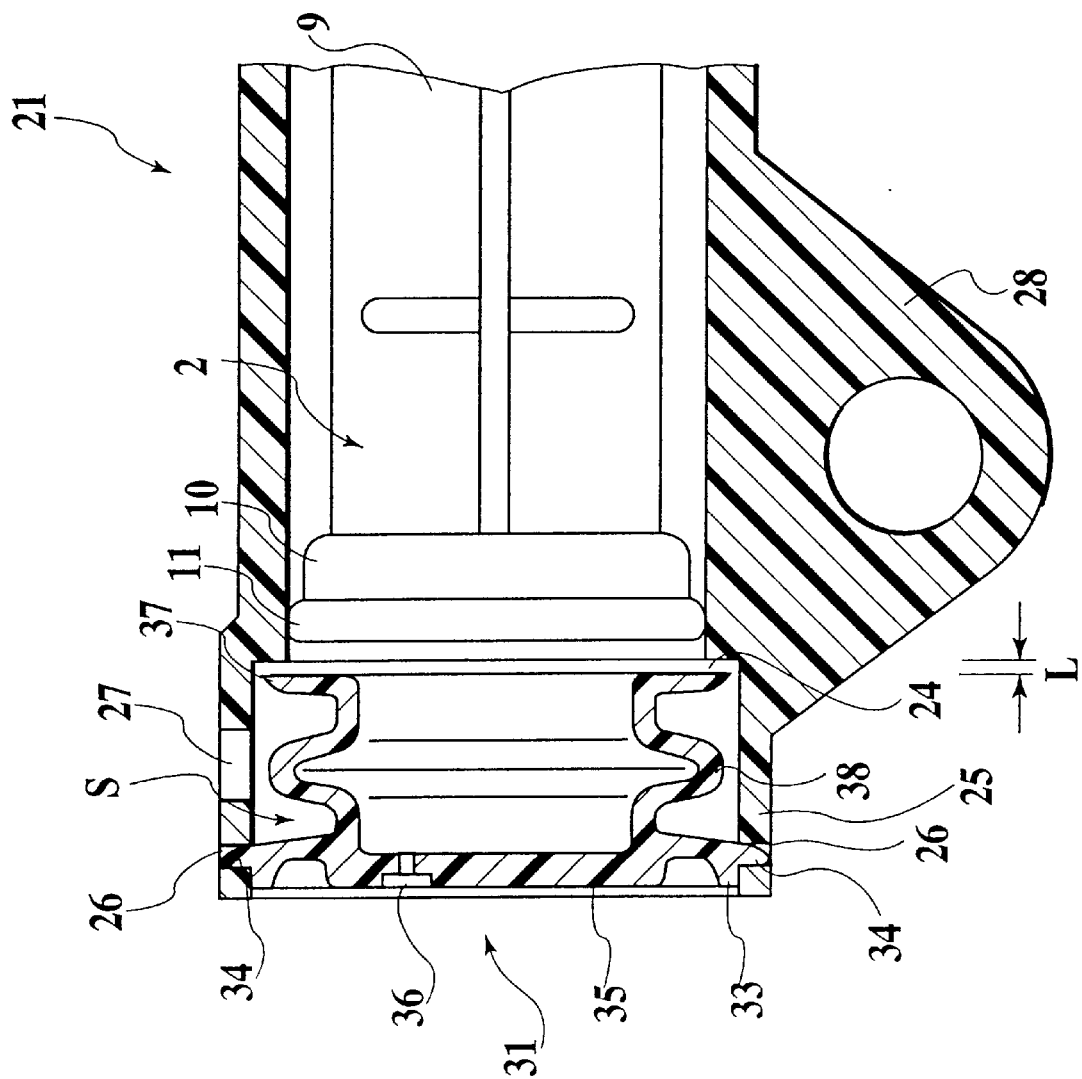

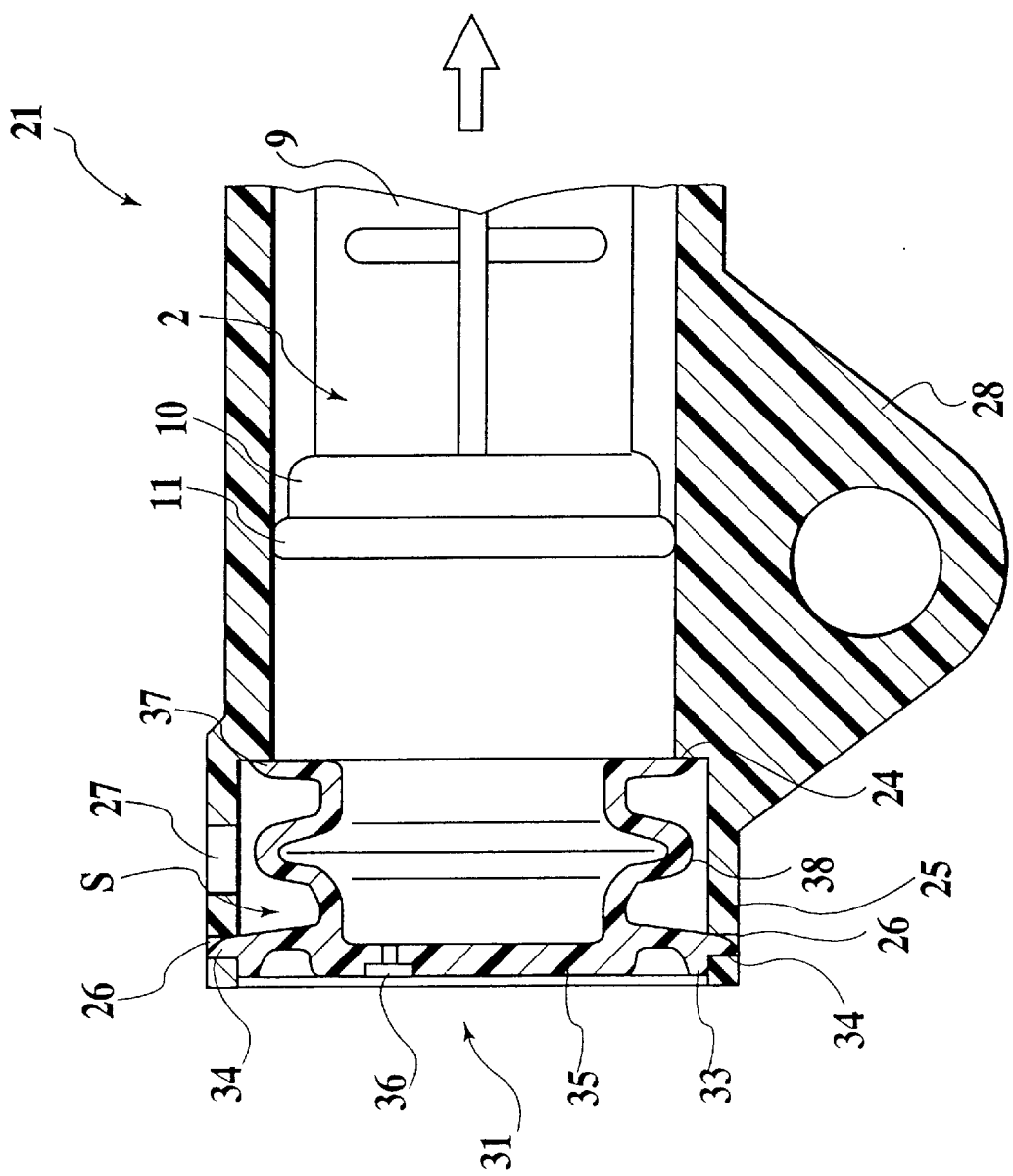

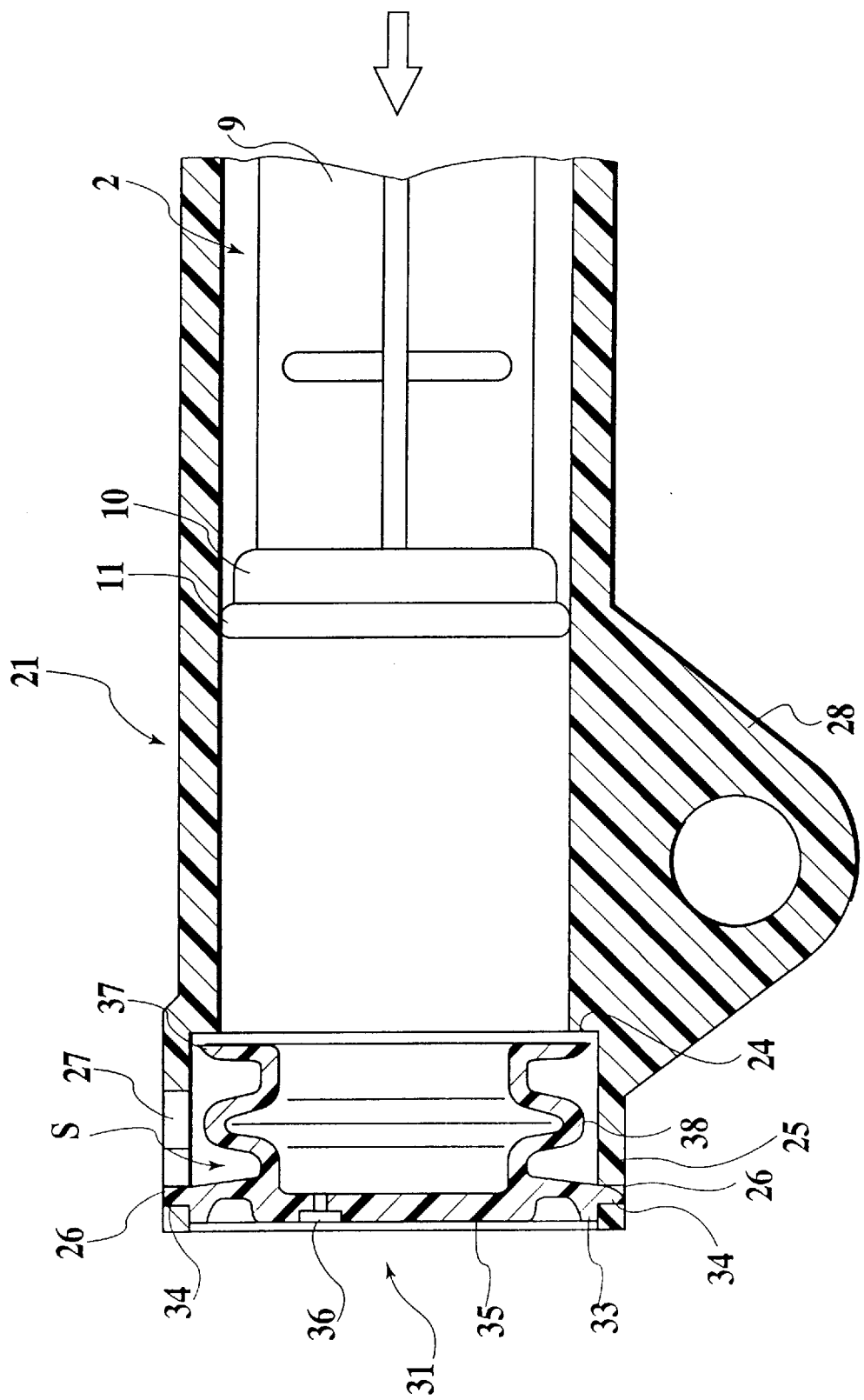

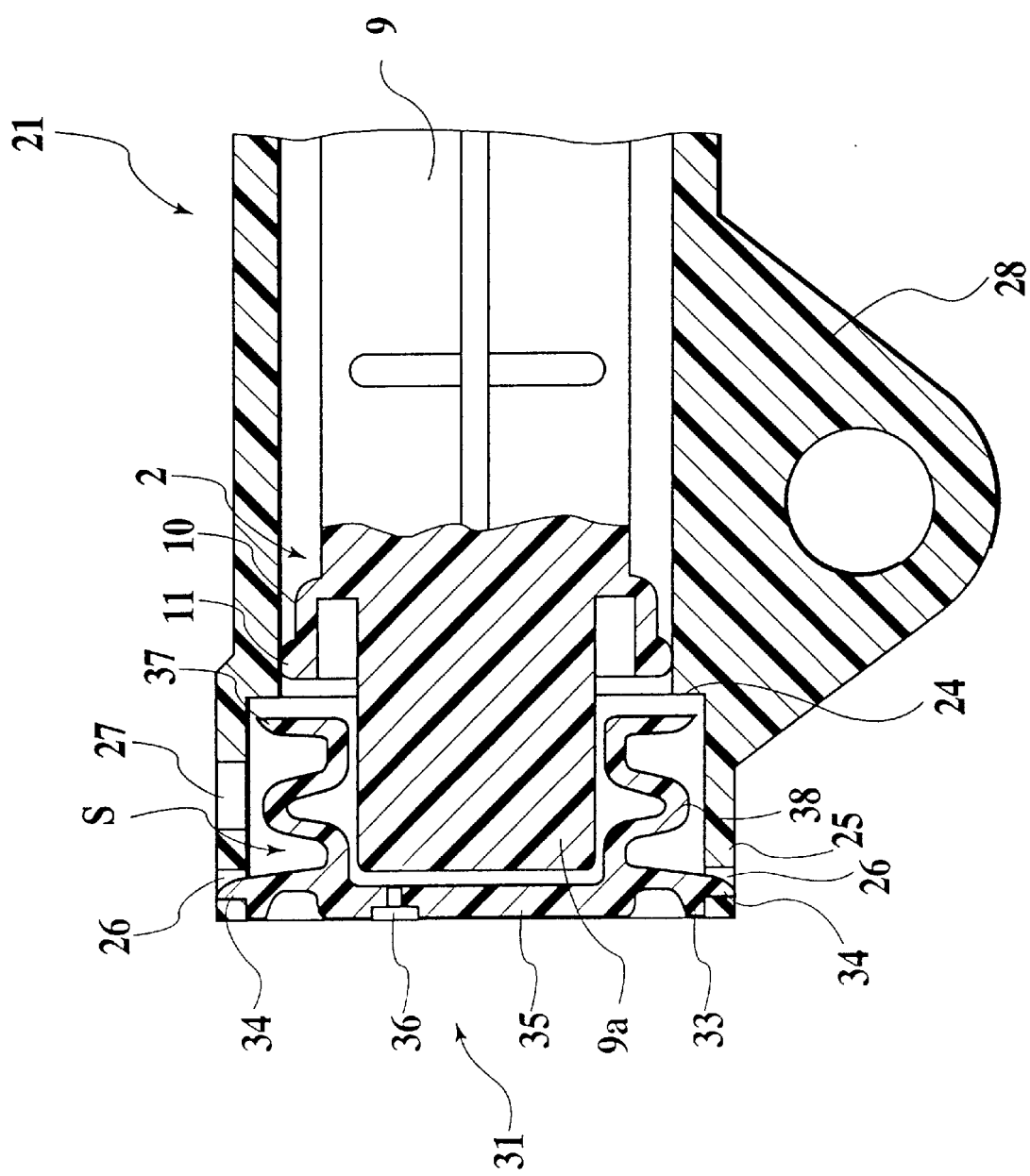

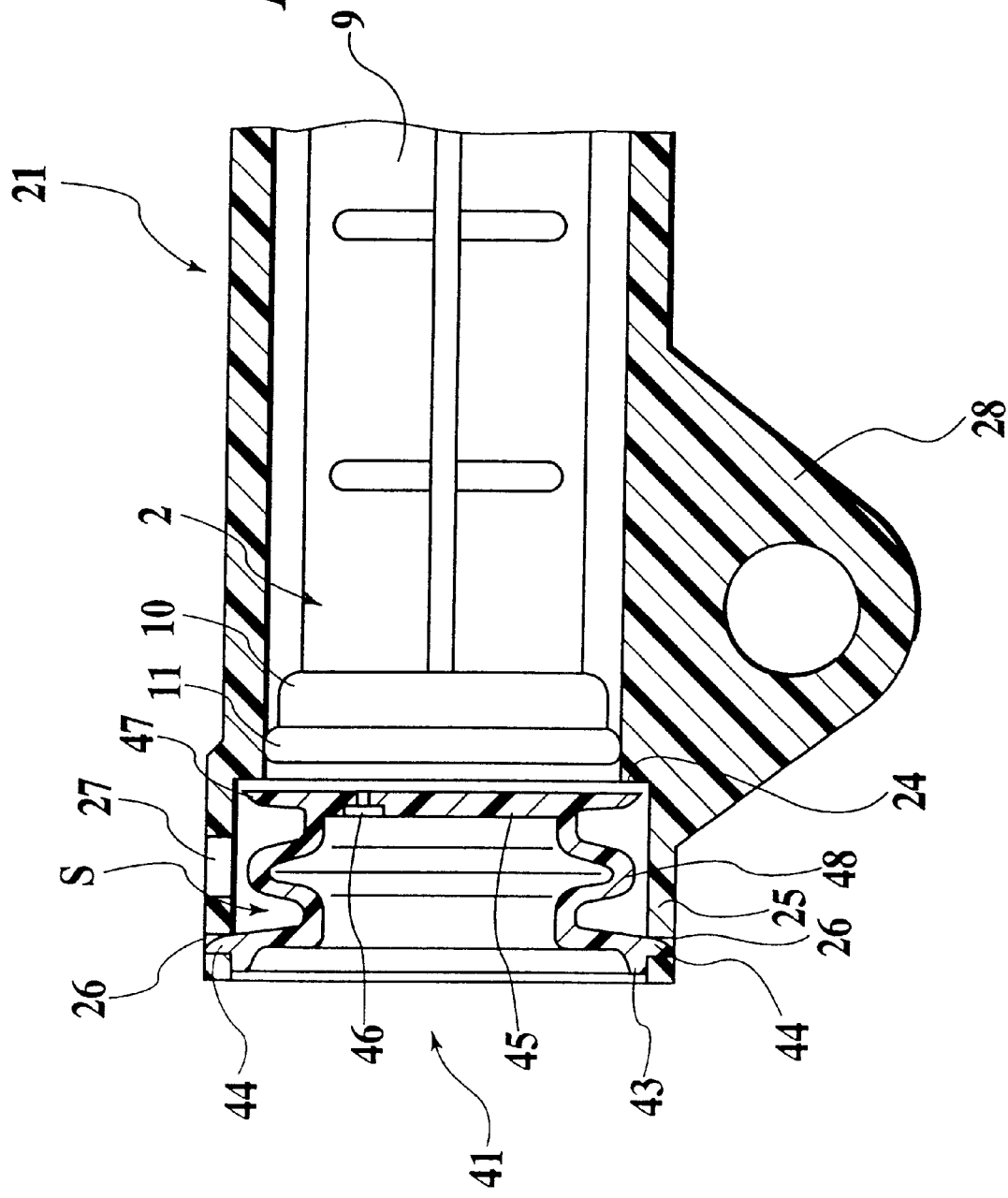

AIR DAMPER

BACKGROUND OF THE INVENTION

1. Field of the Invention

The present invention relates to an air damper, and more particularly, to an improvement of a cylinder type air damper preferably used for a glove box or the like of an automobile.

2. Description of the Related Art

A conventional cylinder type air damper preferably used for a glove box or the like of an automobile, is disclosed in Japanese Patent Application Laid-open No.8-105482.

Although it is not illustrated in the drawings, such a conventional damper comprises a cylinder whose opposite ends are opened, a piston movable in the cylinder, and a cap for closing one of the opening of the cylinder. The piston is provided with an orifice, and is formed at its peripheral surface with an annular recessed groove. A first O-ring which is narrower than a width of the groove, is fitted in the groove such that the first O-ring can move in a widthwise direction. A communication groove is formed in a bottom of the groove so that the communication groove is opened and closed by the movement of the first O-ring within the recessed groove. The cap is formed at its peripheral surface with a plurality of locking holes. By locking each projection provided on the cylinder to its corresponding locking hole, the cap can be mounted to the one end opening through a second O-ring. The other end opening of the cylinder is for allowing a piston rod to pass through the cylinder.

When this air damper is used in the glove box of the automobile, the cylinder is fixed to the side of the instrument panel, and a tip end of the piston rod projecting from the other end of the cylinder is fixed to the side of the glove box. If the glove box door is moved in an opening direction, the piston rod is gradually pulled out from the cylinder so that the piston is moved in the same direction in the cylinder. The glove box is thus reliably moved to an open position slowly by a flowing resistance of air passing through the orifice. In this case, the communication groove is closed by the movement of the first O-ring in the recessed groove.

When the glove box door is moved to close direction, the piston rod is gradually pushed into the cylinder so that the piston is moved in the same direction in the cylinder. The first O-ring is moved in the recessed groove to open the communication groove and release the air in the cylinder. Therefore, the piston is swiftly moved in the opposite direction in the cylinder to assist the closing operation of the glove box.

However, in such a conventional air damper, the second O-ring seal is required even when the cap is mounted to the one end opening. In addition, to secure the one-way system, the first O-ring seal must be movable fitted in the recessed groove of the piston. That is, two O-rings are required and the entire structure is thus complicated. Therefore, assembly is complex and not economical. Finally, if the first O-ring is moved in an inclined state in the recessed groove, the air damper may not be operated smoothly in some cases.

SUMMARY OF THE INVENTION

It is an object of the present invention to provide an economical air damper in which it is unnecessary to use plural O-rings. Thus the assembly is easier in which it is unnecessary to use plural O-rings, the structure is simple, and a reliable operation is realized.

In order to achieve the above object, an air damper of the present invention comprises a cylinder provided at its opposite ends with openings one of which is formed with a seal surface. A piston member is movable in the cylinder member along its axial direction to generate a variation in pressure in the cylinder member. A cap member is provided on the one opening of the cylinder member. At least a portion of the cap member is capable of moving between a state where the cap member is in contact with the seal surface and a state where the cap member is separated from the seal member. This movement occurs with the variation in pressure caused by the movement of the piston member. Further, in the state where the cap member is separated from the seal surface, air in the cylinder member can flow out from a space between the cap member and the seal surface.

With the above arrangement, a so-called one-way type air damper capable of reliably operating can be provided together with a simple and convenient manner in which the number of parts is reduced, assembly is easy and the costs are reduced.

More specifically, the seal surface of the cylinder member may be an annular surface extending in a circumferential direction of the cylinder member. The cylinder member further may comprise an extension portion extending beyond the seal surface toward the cap member along the axial direction of the cylinder member. The cap member may comprise a disk-like base plate mounted to the extension portion of the cylinder member and a seal flange extending the base plate toward the seal surface along the axial direction of the cylinder member while projecting outward of the diametrical direction of the cylinder member. The seal flange of the cap member may be capable of moving between a state where the seal flange is in contact with the seal surface and a state where the seal flange is separated from the seal member in correspondence with the variation in pressure caused by the movement of the piston member.

With the above arrangement, a one way air damper in which air in the cylinder member is reliably sealed and reliably released is realized.

More particularly, the seal surface extends in a direction vertical to the axial direction of the cylinder member.

Further, and more specifically, the extension portion of the cylinder member may be an extension cylinder portion, and the extension cylinder portion of the cylinder member may be provided with a locking hole. The base plate of the cap member may be provided at a peripheral surface with a locking piece so as to be movably locked in the locking hole. In a state where the locking piece is locked in the locking hole, the base plate may be capable of moving in two directions, i.e., in a direction in which the seal flange of the cap member is contacted with the seal surface and in a direction in which the seal flange of the cap member is separated from the seal surface, this movement occurs along the axial direction of the cylinder member within a range of the extension cylinder portion of the cylinder member due to variation in pressure caused by the movement of the piston member.

Since the locking hole restricts the movement of the locking piece of the base plate, the movement of the cap member is also restricted correspondingly. Thus, it is possible to effectively prevent the seal flange from being pushed against the seal surface, which could cause fatigue of the seal flange. Also, that is because the locking piece of the base plate can move in the locking hole, and the seal flange moves together with the cap member. Therefore, it is possible to effectively suppress a vibration or noise, which are generated when the seal flange moves alone.

Further, it is preferable that the air damper of the invention comprises means provided between the cylinder member and the cap member for restricting a position where the cap member is separated from the seal surface of the cylinder member, because air in the cylinder member can reliably and effectively released outside.

Furthermore, in the air damper of the invention, the seal surface of the cylinder member may be an annular surface extending in a circumferential direction of the cylinder member. The cylinder member further may comprise an extension portion extending beyond the seal surface toward the cap member along the axial direction of the cylinder member. The cap member may comprise a lock portion fixed to the extension portion of the cylinder member, a seal flange capable of contacting with and separating from the seal surface of the cylinder member, and a resiliently deforming portion located between the lock portion and the seal flange and capable of expanding and contracting. A base plate closes the one opening of the cylinder member, and the seal flange of the cap member may be capable of moving between a state where the seal flange is in contact with the seal surface and a state where the seal flange is separated from the seal member in correspondence with the variation in pressure caused by the movement of the piston member by expanding and contracting movement of the resiliently deforming portion.

With the above arrangement, a one way type air damper in which air in the cylinder member is reliably sealed and reliably released is realized.

More particularly, the seal surface extends in a direction vertical to the axial direction of the cylinder member.

Further, more specifically, the extension portion of the cylinder member may be an extension cylinder portion, the resiliently deforming portion of the cap member may define a space which is in communication with outside between the resiliently deforming portion and the extension cylinder portion of the cylinder member, and the base plate of the cap member may exist at the side of the lock portion with respect to the resiliently deforming portion. This is preferable because air in the cylinder member can be reliably sealed and also air in the cylinder member can be reliably released.

Alternatively, the extension portion of the cylinder member may be an extension cylinder portion, the resiliently deforming portion of the cap member may define a space which is in communication with outside between the resiliently deforming portion and the extension cylinder portion of the cylinder member, and the base plate of the cap member may exist at the side of the seal flange with respect to the resiliently deforming portion. This is preferable because air in the cylinder member can be sealed more reliably, air in the cylinder member can be released more reliably, and a reliable damper force is generated from an initial stage.

In the air damper of the invention, it is preferable that the piston member comprises a projection capable of entering the cap member together corresponding to a movement of the piston member, because a reliable damper force is generated from an initial stage.

More particularly, in the air damper of the invention, it is preferable that the cylinder member, the piston member and the cap member are made of thermoplastic elastomer, and the thermoplastic elastomer used in the cylinder member includes oil component, in view of its better operation.

More particularly, too, in the air damper of the invention, it is preferable that the cylinder member, the piston member and the cap member are made of thermoplastic elastomer, and the thermoplastic elastomer used in the cap member is softer than that used in the piston member, in view of its better operation. Further, regarding a structure for sealing of the air damper of the invention, the piston member may have a seal projection, and an outer diameter of the seal projection may be larger than an inner diameter of the cylinder member. Here, an inner portion of the piston member corresponding to the seal projection may have a recessed portion, so that more secure sealing characteristic can be attained.

More specifically, the seal projection has an annular shape. In addition, in the air damper of the invention, the piston member preferably includes a piston rod having a mounting hole and provided with a cross shaped section, and a thickness around the mounting hole of the piston rod is preferably thicker than that of the cross shaped section.

BRIEF DESCRIPTION OF THE DRAWINGS

FIG. 11 is a sectional view showing an assembled state of the air damper of the second embodiment;

FIG. 12 is an enlarged sectional view of an essential portion showing the assembled state of the air damper of the second embodiment;

FIG. 13 is an enlarged sectional view of an essential portion showing a state where air is flowed into the cylinder to obtain a damper effect in the air damper of the second embodiment;

FIG. 14 is an enlarged sectional view of an essential portion showing a state where air in the cylinder is released outside in the air damper of the second embodiment;

FIG. 15 is an enlarged sectional view of an essential portion showing a modification of the air damper of the second embodiment; and FIG. 16 is an enlarged sectional view of an essential portion showing a structure of a third embodiment of an air damper of the invention.

DETAILED DESCRIPTION OF THE PREFERRED EMBODIMENTS

Each of embodiments of an air damper of the present invention will be explained in detail with reference to the drawings below.

First, a first embodiment of the air damper of the present invention will be explained.

Figure 1:
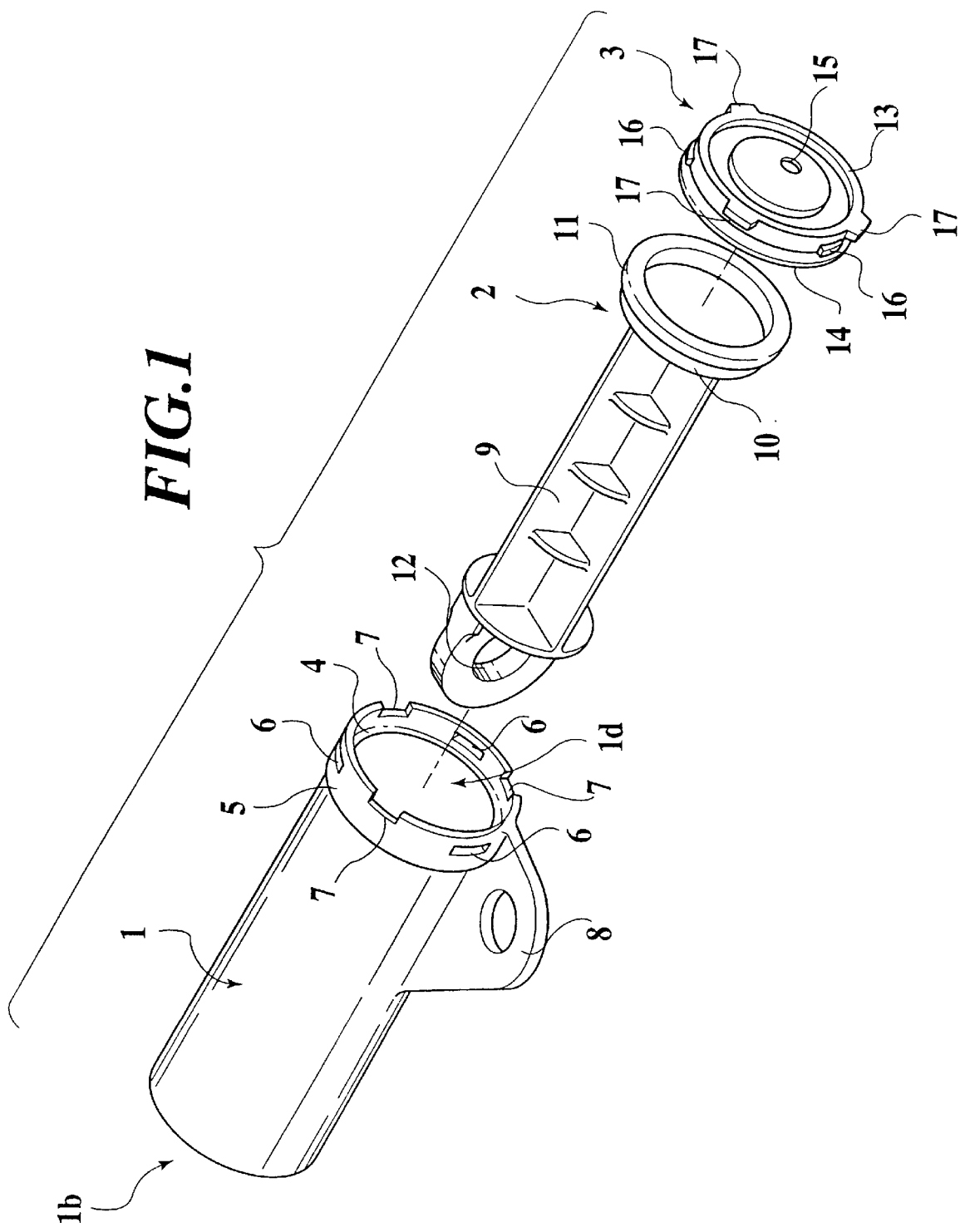
FIG. 1 is an exploded perspective view showing a structure of a first embodiment of an air damper of the present invention.

As shown in FIG. 1, the air damper of the present embodiment includes a cylinder 1 whose opposite ends are opened, a piston 2 movable in the cylinder 1 and a cap 3 for occluding one of the openings of the cylinder 1.

Figure 2:
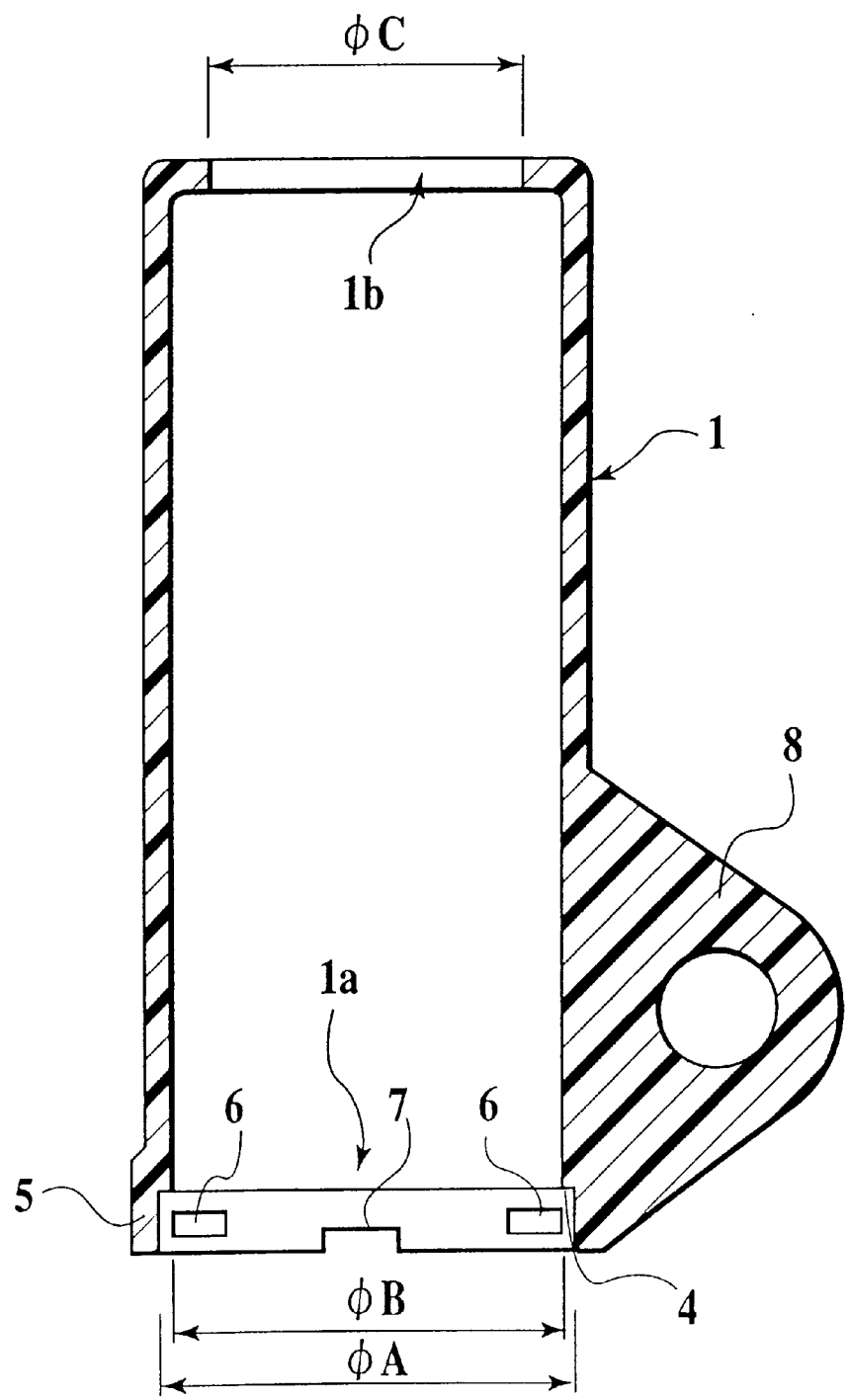
FIG. 2 is a sectional view of a cylinder of the air damper of the first embodiment.

The cylinder 1 is integrally made of thermoplastic elastomer including an oil component. More specifically, as shown in FIG. 2, an annular seal shelf 4 as a seal surface is formed in inner side of the one opening of the cylinder 1, an extension cylinder 5 having a diameter slightly larger than the other general surface is continuously formed such as to extend from a peripheral edge of the seal shelf 4 outward along an axial direction of the cylinder 1, and a plurality of locking holes 6 and a plurality of notches 7 are alternately formed in the extension cylinder 5 at a constant distance from one another. On the other hand, a diameter of the other opening 1b is made smaller than the other general surface such that a piston rod 9 can be inserted. That is, in the cylinder 1, a relation of 0 A>0 B>0 C is established.

Figure 3:
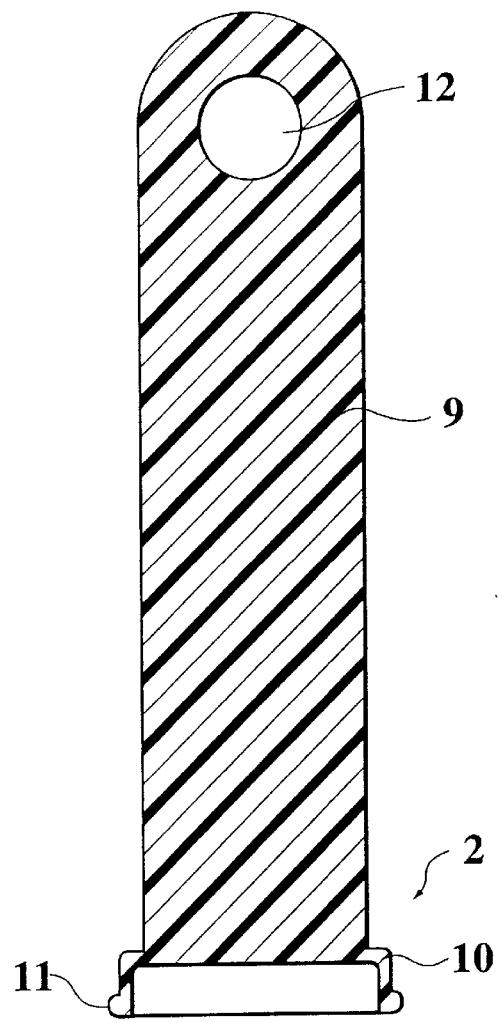
FIG. 3 is a sectional view of a piston of the air damper of the first embodiment.

The piston 2 is formed integrally with the piston rod 9 both of which are made of thermoplastic elastomer in which oil component is not included intentionally. More specifically, as shown in FIG. 3 also, an annular seal projection 11 having a diameter slightly larger than 0 B in the cylinder 1 is integrally formed together with a disk portion 10 of the piston 2 having a diameter slightly smaller than 0 B and formed in a bead shape. A lower surface of the disk portion 10 is recessed so as to positively facilitate the flexure of the annular seal projection 11 within the cylinder 1. The piston rod 9 has a cross shaped section in its central portion and a mounting hole 12 at its end portion. This end portion is formed thicker than the cross shaped section so as to obtain a necessary rigidity. That is, the annular seal projection 11 corresponds to the conventional O-ring, and the annular seal projection 11 is easily flexed so that it slidably moves between the disk portion 10 of the piston 2 and the inner peripheral surface of the cylinder 1 to provide sealing.

Figure 4:
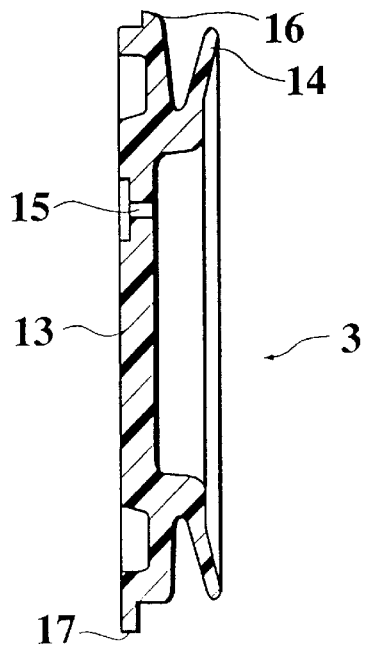
FIG. 4 is a sectional view of a cap of the air damper of the first embodiment.

The cap 3 is integrally made of thermoplastic elastomer which is softer than that of the piston 2. As shown in FIG. 4 also, the cap 3 includes a disk-like base plate 13 movable mounted to the side of the extension cylinder 5 of the cylinder 1, and an annular seal flange 14 extending from the disk-like baseplate 13 to project in a radial direction. Further, the disk-like base plate 13 is provided with an orifice 15, and is formed at its peripheral surface with locking pieces 16 for locking in the locking holes 6, and positioning pieces 17 for locking in the notches 7 of the cylinder 7, so that the seal flange 14 is contacted with and separated from the seal shelf 4 of the cylinder 1 by the variation in pressure caused by the movement of piston 2 in the cylinder 1.

Figure 5:
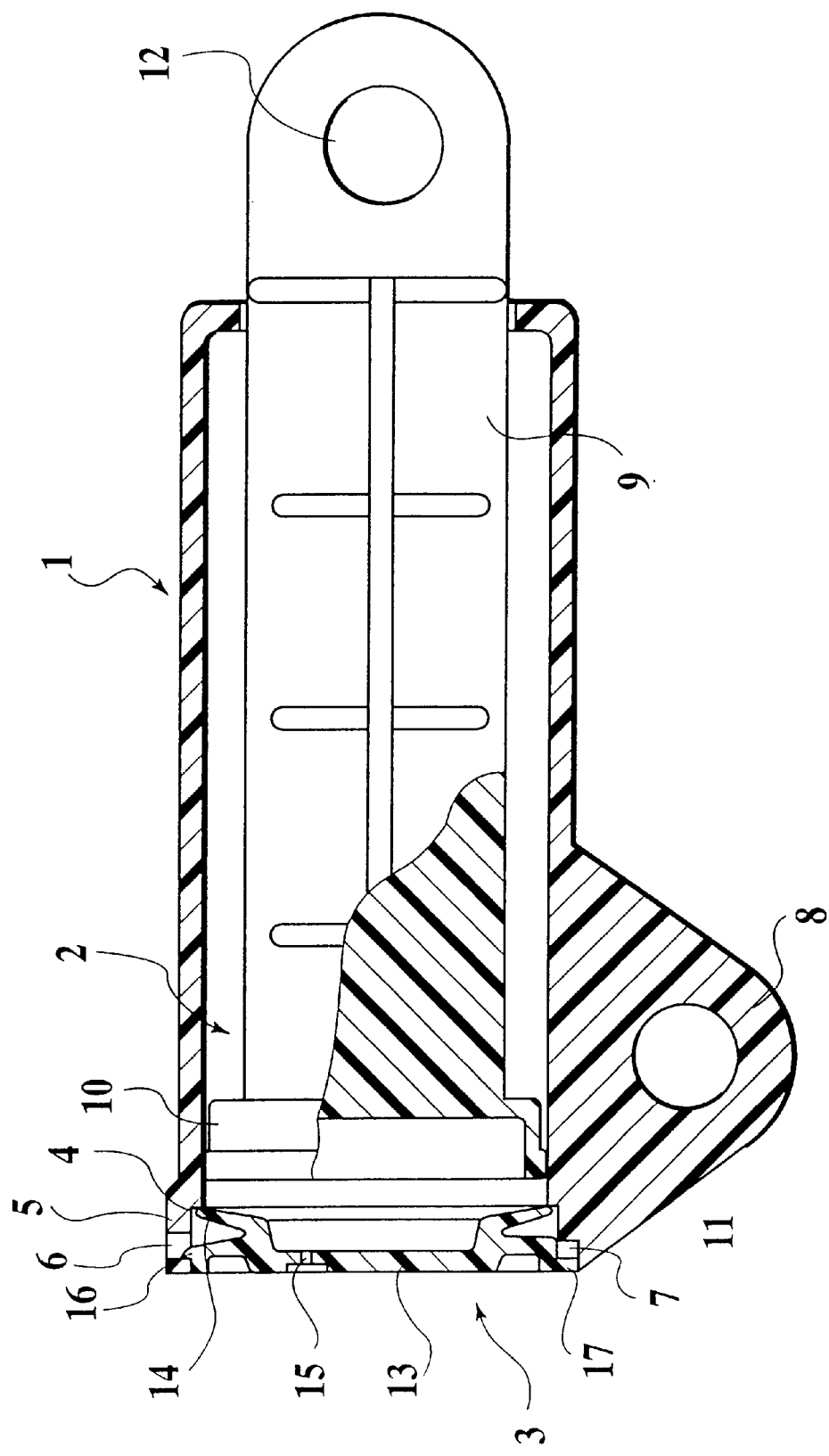
FIG. 5 is a sectional view showing an assembled state of the air damper of the first embodiment.

When the air damper having the above-described structure is assembled, the piston rod 9 and the piston 2 are first inserted into the cylinder 1 from the one opening 1a and then, the cap 3 is pushed into the extension cylinder 5 while each of the positioning pieces 17 is correspondingly placed in each of the notches 7 formed in the cylinder 1. Then, each of the locking pieces 16 of the cap 3 are correspondingly locked in the locking hole 6 formed in the extension cylinder 5. With this operation, as shown in FIG. 5, a so-called one-way type air damper is assembled extremely easily with a simple structure.

Further, in this assembled state, the disk-like base plate 13 of the cap 3 can move in two directions of the axial direction of the cylinder 1, i.e., in a direction to push the piston 2 into the cylinder 1 and a direction to pull out the piston 2 while the locking pieces 16 are kept locking in the locking holes 6 of the cylinder 1 within a range of the locking holes 6 of the extension cylinder 5. Also, the seal flange 14 of the cap 3 is in a state where it is just contacted with the seal shelf 4 of the cylinder 1 in a manner of so-called zero-touch.

When the air damper of the present embodiment is actually used in the glove box of the automobile, as in the conventional technique which is not shown specifically, the cylinder 1 may be rotatably fixed to the side of an instrument panel of the automobile through a mounting piece 8, and the piston rod 9 may be rotatably fixed to the side of the glove box through the mounting hole 12 formed in a tip end of the piston rod 9.

Figure 6:
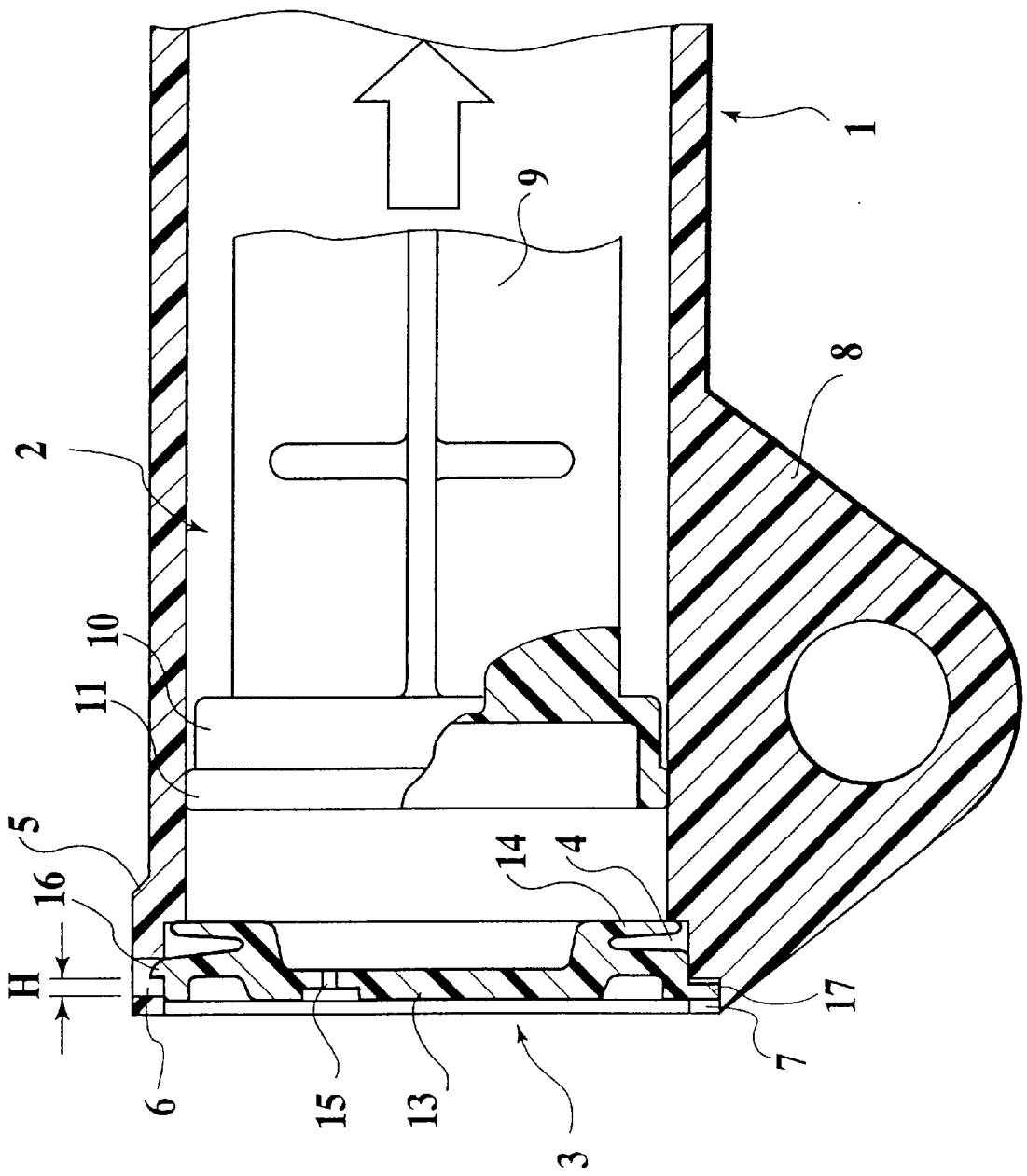
FIG. 6 is an enlarged sectional view of an essential portion showing a state where air is flowed into the cylinder to obtain a damper effect in the air damper of the first embodiment.

If the glove box is moved in its opening direction, the piston rod 9 is gradually pulled out from the cylinder 1, and the piston 2 is moved and pulled out from the cylinder 1. At that time, as shown in FIG. 6 together with an arrow showing the moving direction, the disk-like base plate 13 of the cap 3 is moved by a distance H until the locking piece 16 abuts against an edge of the locking hole 6 of the extension cylinder 5 by the variation in pressure in the cylinder 1, and the seal flange 14 is completely stuck on the seal shelf 4 of the cylinder 1 like a sucking disc. Therefore, air flows into the cylinder 1 only through the orifice 15, thereby obtaining the damper effect so that the glove box can slowly move to its opening state.

Since the locking pieces 16 formed on the disk-like base plate 13 of the cap 3 are moved in the locking holes 6 of the extension cylinder 5 until the movement of the locking pieces are restricted by the edges of the locking holes 6, the seal flange 14 is not pushed against the seal shelf 4 more than necessary by such a restriction effect. Therefore, the seal flange 14 is not excessively fatigued.

Figure 7:
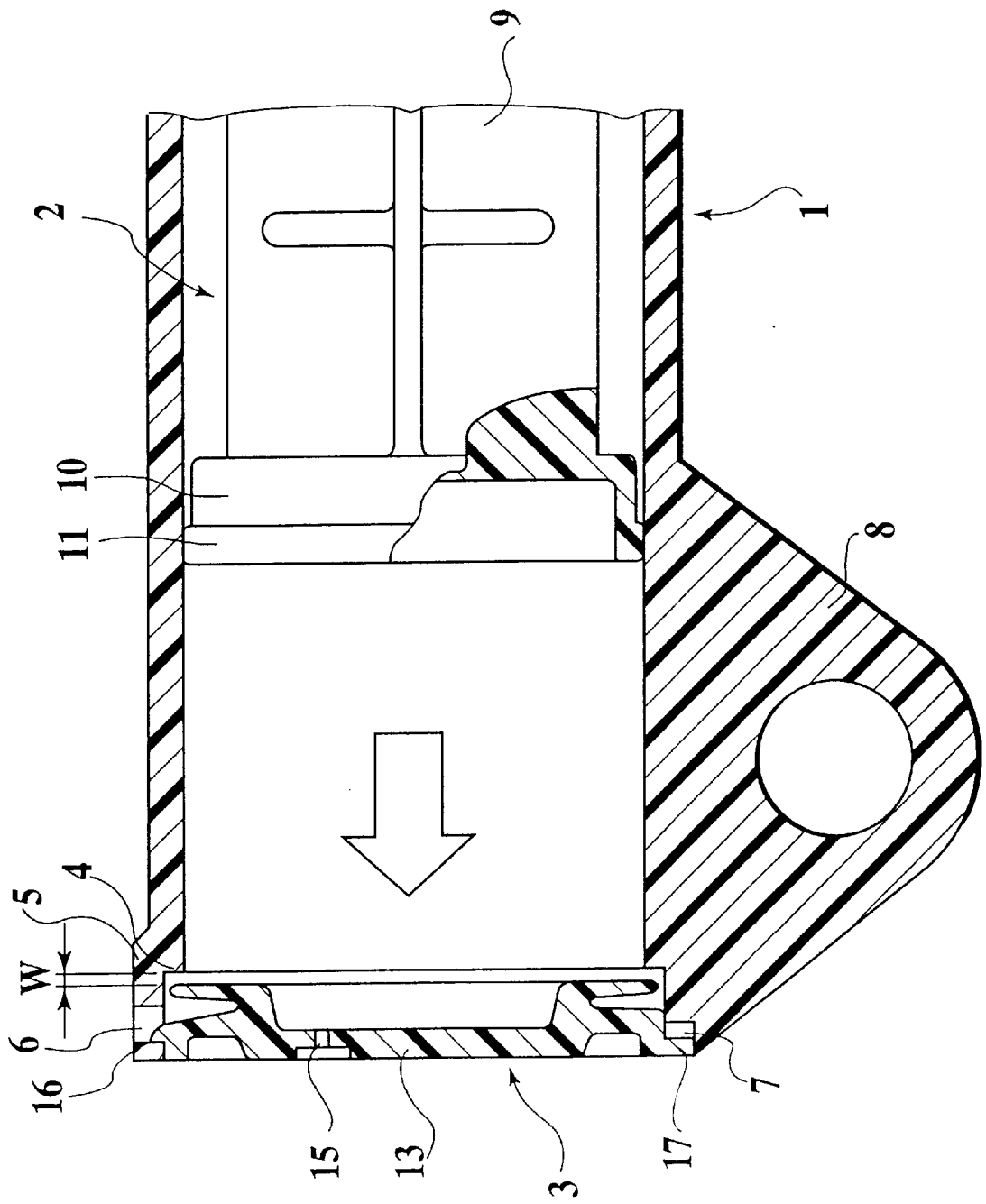
FIG. 7 is an enlarged sectional view of an essential portion showing a state where air in the cylinder is released outside in the air damper of the first embodiment.

On the other hand, when the glove box is moved in a closing direction, and the piston rod 9 is gradually pushed into the cylinder 1 correspondingly, and the piston 2 is also moved and pushed into the cylinder 1. If doing so, as shown in FIG. 7 together with an arrow showing the moving direction, the disk-like base plate 13 of the cap 3 are moved in the extension cylinder 5 in the opposite direction while the positions of the locking-pieces 16 are restricted until the locking pieces 16 formed on the disk-like base plate 13 abut against the opposite edges of the locking holes 6 of the extension cylinder 5 by the air accumulated in the cylinder 1. That is, by the variation in pressure in the cylinder 1. Then, the seal flange 14 is separated from the seal shelf 4 by a distance W so that the air accumulated in the cylinder 1 is brought in to communication with the locking holes 6 in addition to the orifice 15 so as to release the air accumulated to outside and therefore. The piston 2 can be returned to the original position substantially without any resistance. Therefore, the smooth closing operation is assisted.

Further, when the air accumulated in the cylinder is released, a resilient deformation of the seal flange 14 is not only used, but also the seal flange 14 is separated from the seal shelf 4 of the cylinder 1 mainly together with movement of the disk-like base plate 13 of the cap 3. Therefore, the seal flange 14 is unlikely to vibrate or generate a noise due to its resilient deformation.

In the present embodiment, since the cylinder 1 is made of thermoplastic elastomer including oil component, the seal projection 11 of the piston 2 can smoothly slide in the cylinder 1 by the effect of the included oil component. Therefore, the smooth sliding movement is not hindered by deviation of amount of application of grease unlike the conventional technique. Further, since the seal projection 11 of the piston 2 can reliably reduce the residue of air at the end of one stroke of the cylinder 1. Thus, a higher damper effect just after the initial operation of the air damper is expected.

Next, a second embodiment of an air damper of the present invention will be explained.

The basic structure of the air damper of the present embodiment is the same as that of the first embodiment. A structure of the cap and detailed structure related to the cap are different.

Figure 8:
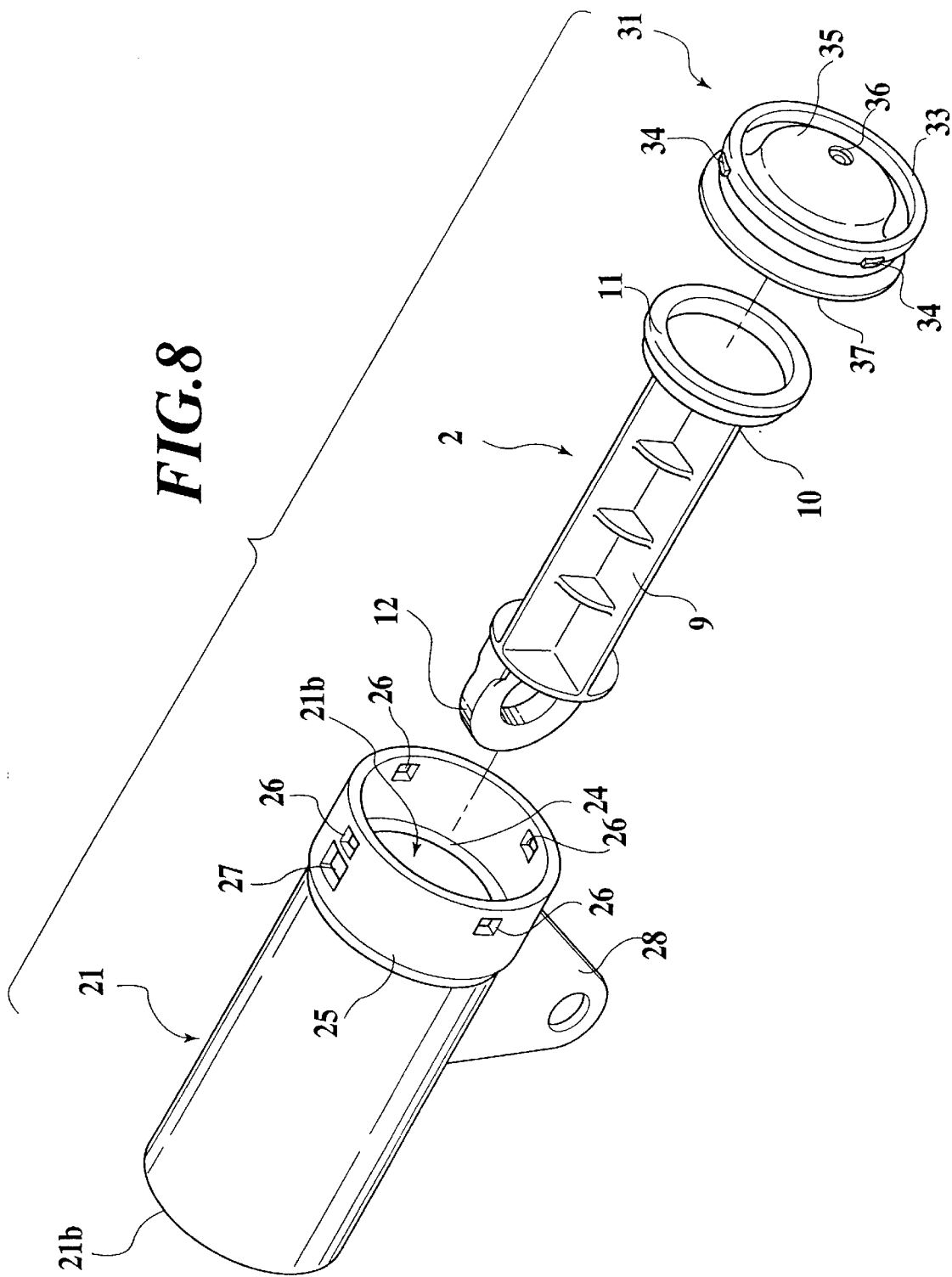
FIG. 8 is an exploded perspective view showing a structure of a second embodiment of an air damper of the invention.

As shown in FIG. 8, the air damper of the second embodiment includes a cylindrical cylinder 21 whose opposite ends are opened. A piston 2 is movable in the cylinder 21 and a cap 31 closes one of the openings of the cylinder 21.

Figure 9:
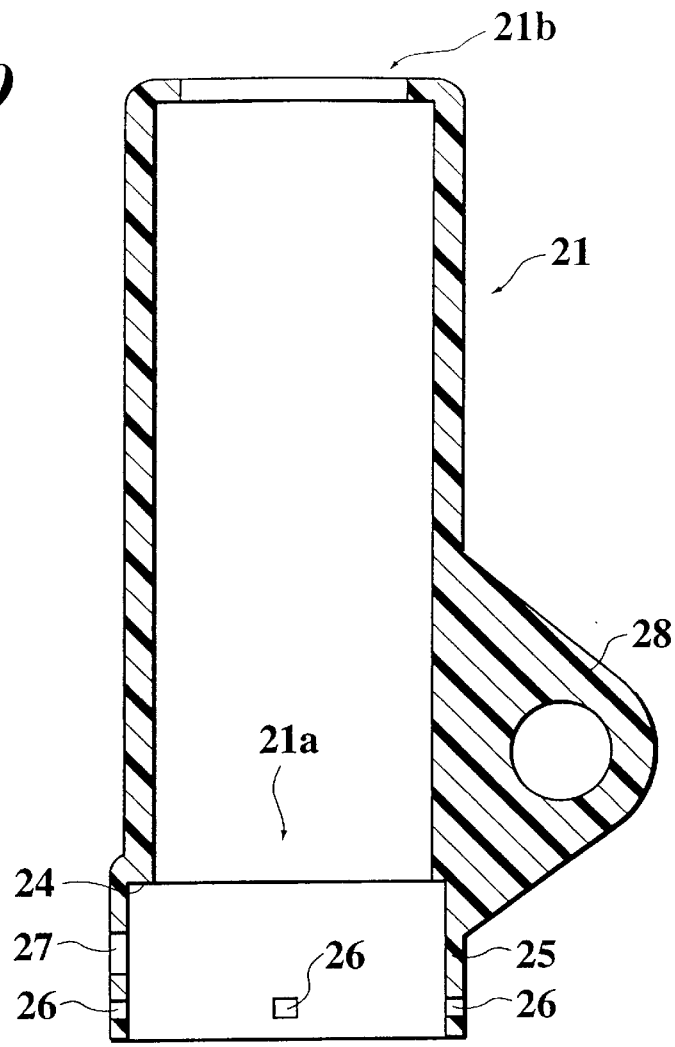
FIG. 9 is a sectional view of a cylinder of the air damper of the second embodiment.

The cylinder 21 is made of the same material and in the same method as that of the cylinder 1 of the first embodiment. More specifically, as shown in FIG. 9 also, an annular seal surface 24 is formed in inner side of the one opening 21a of the cylinder 21, an extension cylinder 25 having a diameter slightly larger than the other general surface is continuously formed such as to extend from a peripheral edge of the seal surface 24 outward along an axial direction of the cylinder 21, and a plurality of locking holes 26 and one communication window 27 are formed in the extension cylinder 25. A diameter of the other opening 21b is made smaller than the other general surface such that a piston rod 9 can be inserted. Further, the relation among the inner diameter of the extension cylinder 25 of the cylinder 21, the diameter of the other general surface of the cylinder 21 and the diameter of the through hole in the opening 21b of the other end of the cylinder 21 is the same as that of the first embodiment.

Figure 10:
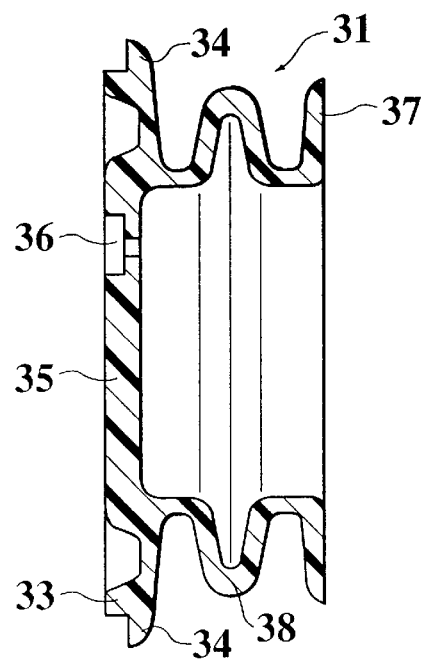
FIG. 10 is a sectional view of a cap of the air damper of the second embodiment.

As shown in FIG. 10, the cap 31 is made of the same material and in the same method as that of the cap 3 in the first embodiment. More specifically, the cap 31 includes a disk-like locking portion 33 formed at a peripheral surface with a plurality of locking pieces 34. A seal base plate 35 is continuously formed on an inner side of the locking portion 33 and formed with an orifice 36 for closing one opening 21a of the cylinder 21. An annular seal flange 37 contacts with and separates a seal surface 24 of the cylinder 21. A resiliently deforming portion 38 is capable of expanding and contracting and located between the seal flange 37 and the locking portion 33. By locking the plurality of locking pieces 34 in locking holes 26 formed in the extension cylinder 25 of the cylinder 21, the locking portion 33 is fixed to the side of the extension cylinder 25. If the bellows-like resiliently deforming portion 38 expands and contracts due to the variation in pressure with the movement of the piston 2 in the cylinder 21, the seal flange 37 is moved so that the seal flange 37 contacts with and separates from the seal surface 24 of the cylinder 21.

Therefore, in this embodiment, after the piston rod 9 and the piston 2 are inserted into the cylinder 21 from the side of the one opening 21a, when the locking pieces 34 formed on the locking portion 33 of the cap 31 are locked in the locking holes 26 formed in the extension cylinder 25 of the cylinder 21, the locking portion 33 is reliably fixed to the side of the extension cylinder 25. Therefore, as shown in FIG. 11, the one-way air damper is assembled extremely easily with a simple structure.

Further, in its assembled state, a cylindrical space S which is in communication with atmosphere through a communication window 27 is defined between the resiliently deforming portion 38 of the cap 33 and the extension cylinder 25 of the cylinder 21.

Further, in this assembled state, as shown in FIG. 12 also, the bellows shape of the resiliently deforming portion 38 is not deformed. The seal flange 37 of the cap 31 does not contact with the seal surface 24 of the cylinder 21, and a clearance L which is sufficiently small is obtained between the seal flange 37 and the seal surface 24 such as to generate a pressure difference in using the air damper.

When the air damper of the present embodiment is actually used in the glove box of the automobile, as in the first embodiment, the cylinder 21 may be rotatably fixed to the side of the instrument panel of the automobile through a mounting piece 28. The piston rod 9 may be rotatably fixed to the side of the glove box through a mounting hole 12.

When the glove box is moved in its opening direction, the piston rod 9 is gradually pulled out from the cylinder 21, the piston 2 is moved and pulled out from the cylinder 21. At that time, as shown in FIG. 13 together with an arrow showing the moving direction, a variation in pressure in the cylinder 21 acts on the seal flange 37 which has a diameter larger than that of the other general surface of the cylinder and has a long peripheral length. The bellows-like resiliently deforming portion 38 is resiliently expanded so that the seal flange 37 is completely stuck on the seal surface 24 of the cylinder 21 like a sucking disc, while moving the seal flange 37. Air only flows into the cylinder 21 through the orifice 36, thereby obtaining the damper effect so that the glove box can slowly move to its opening state. Further, when the movement of the piston 2 is finally stopped, since the bellows shape of the resiliently deforming portion 38 is returned to the original shape, the clearance L, which is the same as defined above, between the seal flange 37 and the seal surface 24 as shown in FIG. 12.

On the other hand, if the glove box when moved in its closing direction, since the piston rod 9 is gradually pushed into the cylinder 21 correspondingly, the piston 2 is also moved and pushed into the cylinder 21. If doing so, at first, a portion of the air accumulated in the cylinder 21 is released outside through the communication window 27 of the extension cylinder 25 through the clearance L defined between the seal flange 37 and the seal surface 24.

As the moving speed of the piston 2 is increased, the resiliently deforming portion 38 is further contracting from the original shape as shown in FIG. 14 so as to positively enlarge the clearance L defined between the seal flange 37 and the seal surface 24. Therefore, the air accumulated in the cylinder 21 is more effectively released outside so that the piston 2 can move back to the original position substantially without any resistance. With this operation, a smooth closing operation of the glove box is assisted.

In the present embodiment, as in the first embodiment, although the lower surface of the disk portion 10 of the piston 2 is simply recessed, a projection 9a projecting inward of the resiliently deforming portion 38 of the cap 31 is integrally provided in the recessed portion as shown in FIG. 15. Thus, the residue of air in the resiliently deforming portion 38 can be reduced as small as possible, and a higher damper effect just after the initial operation can be reliably expected.

Finally, an air damper according to a third embodiment will be explained.

The present embodiment is basically the same as the second embodiment. In the second embodiment, the seal base plate 35 of the cap 31 exists at the side of the locking portion 33 of the resiliently deforming portion 38. In this embodiment, however, as shown in FIG. 16, a seal base plate 45 of a cap 41 exists at the side of a seal flange 47 of a resiliently deforming portion 48, and an orifice 46 is provided. A locking portion 43, locking pieces 44, a seal flange 47 and the resiliently deforming portion 48 which are other constituent elements of the cap 41 are the same as those of the second embodiment.

In the present embodiment, since the seal base plate 45 exists at the side of the seal flange 47, it is possible to effectively reduce the residue of air at the end of the cylinder 21 stroke. Further, a variation in pressure due to the movement of the piston 2 in the cylinder 21 widely acts on the seal base plate 45 so that the resiliently deforming portion 48 of the cap 41 can be contracted by a greater force. Therefore, when the glove box is moved in its opening direction, since the resiliently deforming portion 48 of the cap 41 can be sufficiently expanded so as to move the seal flange 47 largely, a reliable sealing property between the cylinder 21 and the seal surface 24 can be obtained. Therefore, even if the seal flange 47 is slightly worn out, since the seal flange 47 can closely adhere to the seal surface 24 by the sufficient expansion of the resiliently deforming portion 48, the possibility of a sealing property deteriorating is extremely low.

On the other hand, when the glove box is moved in its closing direction, the resiliently deforming portion 48 of the cap 41 can be sufficiently contracted so as to largely move the seal flange 47 in the opposite direction. Therefore, the clearance L defined between the seal flange 47 and the seal surface 24 can swiftly be enlarged to largely release the air accumulated in the cylinder 21 outside. Therefore, a smooth closing operation of the glove box is further assisted.

It is needless to say that the air damper according to the present invention is not restricted to the concrete structures of the embodiments described above at least within the extent in which the air in the cylinder member can flow out from the space between the cap member and the seal surface in the state where the cap member is separated from the seal surface. That is, modifications and variations of the embodiments described above will occur to those skilled in the art, in light of the teachings.

What is claimed is:

1. An air damper, comprising:

a cylinder member extending along an axis between opposite ends defining openings, one of said openings formed with a seal surface;

a piston member movable in said cylinder member along said axial direction, a variation in pressure in said cylinder member being generated by the movement of said piston member;

a cap member provided on said one opening of said cylinder member, at least a portion of said cap member being capable of moving between a state where said cap member is in contact with said seal surface and a state where said cap member is separated from said seal surface in correspondence with the variation in pressure caused by the movement of said piston member; and when said cap member is separated from said seal surface, air in said cylinder member can flow out from a space between said cap member and said seal surface.

2. An air damper according to claim 1, wherein said seal surface of said cylinder member is an annular surface extending in a circumferential direction of said cylinder member, said cylinder member having an extension portion extending beyond said seal surface toward said cap member along said axial direction of said cylinder member, said cap member has a disk-like base plate mounted to said extension portion of said cylinder member and a seal flange extending said base plate toward said seal surface along said axial direction of said cylinder member and projecting outward of said diametrical direction of said cylinder member, and said seal flange of said cap member is capable of moving between a state where said seal flange is in contact with said seal surface and a state where said seal flange is separated from said seal member in correspondence with said variation in pressure caused by the movement of said piston member.

3. An air damper according to claim 2, wherein said extension portion of said cylinder member is an extension cylinder portion, said extension cylinder portion of said cylinder member provided with a locking hole, said base plate of said cap member provided at a peripheral surface with a locking piece to be movably locked in said locking hole, and in a state where said locking piece is locked in said locking hole, said base plate is capable of moving in two directions along said axial direction of said cylinder member within a range of said extension cylinder portion of said cylinder member in correspondence with said variation in pressure caused by the movement of said piston member, said two directions being a direction in which said seal flange of said cap member contacts said seal surface and a direction in which said seal flange of said cap member is separated from said seal surface.

4. An air damper according to claim 1, further comprising means provided between said cylinder member and said cap member for restricting a position where said cap member is separated from said seal surface of said cylinder member.

5. An air damper according to claim 1, wherein said seal surface of said cylinder member is an annular surface extending in a circumferential direction of said cylinder member, said cylinder member further comprises an extension portion extending beyond said seal surface toward said cap member along said axial direction of said cylinder member, said cap member comprises a lock portion fixed to said extension portion of said cylinder member, a seal flange capable of contacting and separating from said seal surface of said cylinder member, a resiliently deforming portion located between said lock portion and said seal flange and capable of expanding and contracting, and a base plate for closing said one opening of said cylinder member, and said seal flange of said cap member is capable of moving between a state where said seal flange is in contact with said seal surface and a state where said seal flange is separated from said seal member in correspondence with said variation in pressure caused by the movement of said piston member by expanding and contracting movement of said resiliently deforming portion.

6. An air damper according to claim 5, wherein said extension portion of said cylinder member is an extension cylinder portion, said resiliently deforming portion of said cap member defines a space which is in communication with outside between said resiliently deforming portion and said extension cylinder portion of said cylinder member, and said base plate of said cap member exists at the side of said lock portion with respect to said resiliently deforming portion.

7. An air damper according to claim 5, wherein said extension portion of said cylinder member is an extension cylinder portion, said resiliently deforming portion of said cap member defines a space which is in communication with outside between said resiliently deforming portion and said extension cylinder portion of said cylinder member, and said base plate of said cap member exists at the side of said seal flange with respect to said resiliently deforming portion.

8. An air damper according to claim 1, wherein said piston member comprises a projection capable of entering said cap member corresponding to the movement of said piston member.

9. An air damper according to claim 2, wherein said seal surface extends in a direction vertical to said axial direction of said cylinder member.

10. An air damper according to claim 5, wherein said seal surface extends in a direction vertical to said axial direction of said cylinder member.

11. An air damper according to claim 1, wherein said cylinder member, said piston member and said cap member are made of thermoplastic elastomer, and said thermoplastic elastomer used in said cylinder member includes oil component.

12. An air damper according to claim 1, wherein said cylinder member, said piston member and said cap member are made of thermoplastic elastomer, and said thermo plastic elastomer used in said cap member is softer than that used in said piston member.

13. An air damper according to claim 1, wherein said piston member has a seal projection, and an outer diameter of said seal projection is larger than an inner diameter of said cylinder member.

14. An air damper according to claim 13, wherein an inner portion of said piston member corresponding to said seal projection has a recessed portion.

15. An air damper according to claim 13, wherein said seal projection has an annular shape.

16. An air damper according to claim 13, wherein said piston member includes a piston rod having a mounting hole and provided with a cross shaped section, and a thickness around said mounting hole of said piston rod is thicker than that of said cross shaped section.

* * * * *